US008566269B2

(12) United States Patent
Jajodia et al.

(10) Patent No.: US 8,566,269 B2
(45) Date of Patent: Oct. 22, 2013

(54) INTERACTIVE ANALYSIS OF ATTACK GRAPHS USING RELATIONAL QUERIES

(75) Inventors: Sushil Jajodia, Oakton, VA (US); Lingyu Wang, Montreal (CA); Anoop Singhal, Gaithersburg, MD (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 780 days.

(21) Appl. No.: 11/831,914

(22) Filed: Jul. 31, 2007

(65) Prior Publication Data
US 2008/0046393 A1 Feb. 21, 2008

Related U.S. Application Data

(60) Provisional application No. 60/821,052, filed on Aug. 1, 2006.

(51) Int. Cl.
*G06F 21/06* (2006.01)
*G06F 19/28* (2011.01)
*G06F 15/163* (2006.01)

(52) U.S. Cl.
USPC ............................................ 706/50; 707/781

(58) Field of Classification Search
USPC ................................................................ 706/50
See application file for complete search history.

(56) References Cited

PUBLICATIONS

Sheyner et al., Tools for Generating and Analyzing Attack Graphs, FMCO 2003, LNCS 3188, pp. 344-371, 2004.*
Sheyner, Scenario Graphs and Attack Graphs [online], Apr. 2004 [retrieved on Aug. 2, 2011]. Retrieved from the Internet:<URL:http://www.cs.cmu.edu/~odobzins/scenariograph/as_files/thesis.pdf>.*

* cited by examiner

*Primary Examiner* — Jeffrey A Gaffin
*Assistant Examiner* — Nathan Brown, Jr.
(74) *Attorney, Agent, or Firm* — DLA Piper LLP (US)

(57) ABSTRACT

An attack graph analysis tool that includes a network configuration information input module, a domain knowledge input module, a network configuration information storage module, a domain knowledge storage module, and a result generation module. The network configuration information input module inputs network configuration information. The domain knowledge input module inputs domain knowledge for the network. The network configuration information storage module stores network configuration information in a network database table. The domain knowledge storage module stores the domain knowledge in an exploit database table. The result generation module generates a result using the network database table and exploit database table. The result may be generated in response to a query to a database management system that has access to the network database table and exploit database table. The network may be reconfigured to decrease the likelihood of future attacks using the attack information learned from the result.

21 Claims, 10 Drawing Sheets

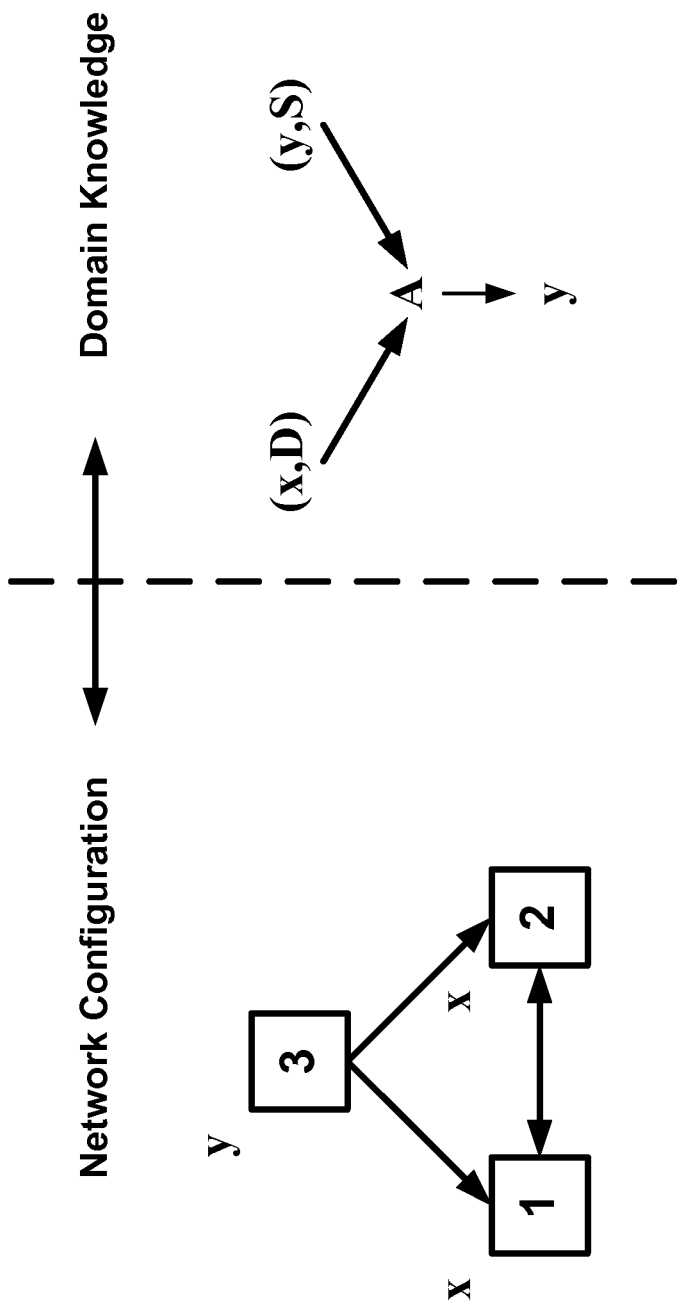

Table 1

| $hh(HH)$ | $hc(HC)$ | $cv(CV)$ | $vc(VC)$ |
|---|---|---|---|
| $H_s\ H_d$ | $H\ C$ | $C\ F\ V$ | $V\ C$ |
| 1 2<br>2 1<br>3 1<br>3 2 | 3 y<br>1 x<br>2 x | x D A<br>y S A | A y |

FIGURE 3

Table 2

$Q_1$

| $H_s$ | $H_d$ | $V$ | $H$ | $C$ |
|---|---|---|---|---|
| 1 | 2 | $A$ | 1 | $x$ |
| 1 | 2 | $A$ | 2 | $x$ |
| 2 | 1 | $A$ | 1 | $x$ |
| 2 | 1 | $A$ | 2 | $x$ |
| 3 | 1 | $A$ | 1 | $x$ |
| 3 | 1 | $A$ | 3 | $y$ |
| 3 | 2 | $A$ | 2 | $x$ |
| 3 | 2 | $A$ | 3 | $y$ |

$Q_2$

| $H_s$ | $H_d$ | $V$ | $H$ | $C$ |
|---|---|---|---|---|
| 1 | 2 | $A$ | 1 | $y$ |
| 2 | 1 | $A$ | 2 | $y$ |

$Q_e$

| $H_s$ | $H_d$ | $V$ |
|---|---|---|
| 3 | 1 | $A$ |
| 3 | 2 | $A$ |

$Q_{ce}$

| $H_s$ | $H_d$ | $V$ | $H$ | $C$ |
|---|---|---|---|---|
| 3 | 1 | $A$ | 1 | $x$ |
| 3 | 2 | $A$ | 2 | $x$ |
| 3 | 1 | $A$ | 3 | $y$ |
| 3 | 2 | $A$ | 3 | $y$ |

$Q_{ec}$

| $H_s$ | $H_d$ | $V$ | $H$ | $C$ |
|---|---|---|---|---|
| 3 | 1 | $A$ | 1 | $y$ |
| 3 | 2 | $A$ | 2 | $y$ |

$Q_c$

| $H$ | $C$ |
|---|---|
| 1 | $y$ |
| 2 | $y$ |

FIGURE 4

Table 3

First Iteration

$Q_3$

| H | C |
|---|---|
| 1 | x |
| 2 | y |

$Q_4$

| $H_s$ | $H_d$ | V |
|---|---|---|
| 1 | 2 | A |
| 3 | 2 | A |

$Q_5$

| H | C |
|---|---|
| 1 | x |
| 2 | y |

$Q_A$

| $H_s$ | $H_d$ | V |
|---|---|---|
| 1 | 2 | A |
| 3 | 2 | A |

Second Iteration

$Q_3$

| H | C |
|---|---|
| 1 | y |
| 2 | x |
| 3 | y |

$Q_4$

| $H_s$ | $H_d$ | V |
|---|---|---|
| 3 | 1 | A |
| 2 | 1 | A |

$Q_5$

| H | C |
|---|---|
| 1 | x |
| 2 | y |
| 1 | y |
| 2 | x |
| 3 | y |

$Q_A$

| $H_s$ | $H_d$ | V |
|---|---|---|
| 1 | 2 | A |
| 3 | 2 | A |
| 3 | 1 | A |
| 2 | 1 | A |

Third Iteration

$Q_3$

| H | C |
|---|---|
| 1 | x |
| 3 | y |
| 2 | y |

$Q_4 = \emptyset$ $Q_5$

| H | C |
|---|---|
| 1 | x |
| 2 | y |
| 1 | y |
| 2 | x |
| 3 | y |

$Q_A$

| $H_s$ | $H_d$ | V |
|---|---|---|
| 1 | 2 | A |
| 3 | 2 | A |
| 3 | 1 | A |
| 2 | 1 | A |

FIGURE 5

Table 4

First Iteration $Q_6$

| $H_s$ | $H_d$ | $V$ |
|---|---|---|
| 3 | 1 | $A$ |
| 2 | 1 | $A$ |

$Q_7$

| $H$ | $C$ |
|---|---|
| 1 | $x$ |
| 2 | $y$ |
| 1 | $x$ |
| 3 | $y$ |

Second Iteration $Q_6$

| $H_s$ | $H_d$ | $V$ |
|---|---|---|
| 3 | 2 | $A$ |

$Q_7$

| $H$ | $C$ |
|---|---|
| 3 | $y$ |
| 2 | $x$ |

FIGURE 6

Table 5

First Iteration

| $Q_8$ | | | $Q_9$ | | | | $Q_{10}=\emptyset$ | $Q_{11}$ | |
|---|---|---|---|---|---|---|---|---|---|
| $H_s$ | $H_d$ | $V$ | $H_s$ | $H_d$ | $V$ | $H$ | $C$ | $H$ | $C$ |
| 3 | 2 | $A$ | 3 | 2 | $A$ | 2 | $y$ | 2 | $y$ |
| 1 | 2 | $A$ | 1 | 2 | $A$ | 2 | $y$ | | |

Second Iteration

| $Q_8$ | | | $Q_9$ | | | | $Q_{10}$ | | | | $Q_{11}=\emptyset$ |
|---|---|---|---|---|---|---|---|---|---|---|---|
| $H_s$ | $H_d$ | $V$ | $H_s$ | $H_d$ | $V$ | $H$ | $C$ | $H_s$ | $H_d$ | $V$ | $H$ | $C$ |
| 2 | 1 | $A$ | 2 | 1 | $A$ | 1 | $y$ | 3 | 1 | $A$ | 1 | $y$ |

FIGURE 7

INTERACTIVE ANALYSIS OF ATTACK GRAPHS USING RELATIONAL QUERIES

CROSS-REFERENCE TO RELATED APPLICATIONS

This application claims the benefit of U.S. Provisional Application No. 60/821,052, filed Aug. 1, 2006, entitled "Interactive Analysis of Attack Graphs Using Relational Queries," which is hereby incorporated by reference in its entirety.

STATEMENT REGARDING FEDERALLY SPONSORED RESEARCH OR DEVELOPMENT

This invention was made with government support under: FA8750-05-C-0212 awarded by Air Force Research Laboratory/Rome; contracts nos.: DAAD19-03-1-0257 and W91INF-05-1-0374FA8750-05-C-0212 awarded by Army Research Office; contract no. DTFAWA-04-P-00278/0001 awarded by the Federal Aviation Administration; and contract nos. IIS-0242237 and IIS-0430402 awarded by the National Science Foundation. The government has certain rights in the invention.

BRIEF DESCRIPTION OF THE SEVERAL VIEWS OF THE DRAWINGS

FIG. 2 shows an example of a network configuration and domain knowledge used in generating an attack graph as per an aspect of an embodiment of the present invention.

FIG. 3 shows a table that describes a relational model composed of four relations as per an aspect of an embodiment of the present invention.

FIG. 4 shows a table with an example of one iteration in deriving a attack graph as per an aspect of an embodiment of the present invention.

FIG. 5 shows a table used to illustrate an example of analyzing attack graphs for alert correlation and prediction as per an aspect of an embodiment of the present invention.

FIG. 6 shows a table used to illustrate an example of enumerating relevant exploits and network hardening as per an aspect of an embodiment of the present invention.

FIG. 7 shows a table that illustrates an example of incremental updates as per an aspect of an embodiment of the present invention.

DETAILED DESCRIPTION OF EMBODIMENTS

Figure 1A:
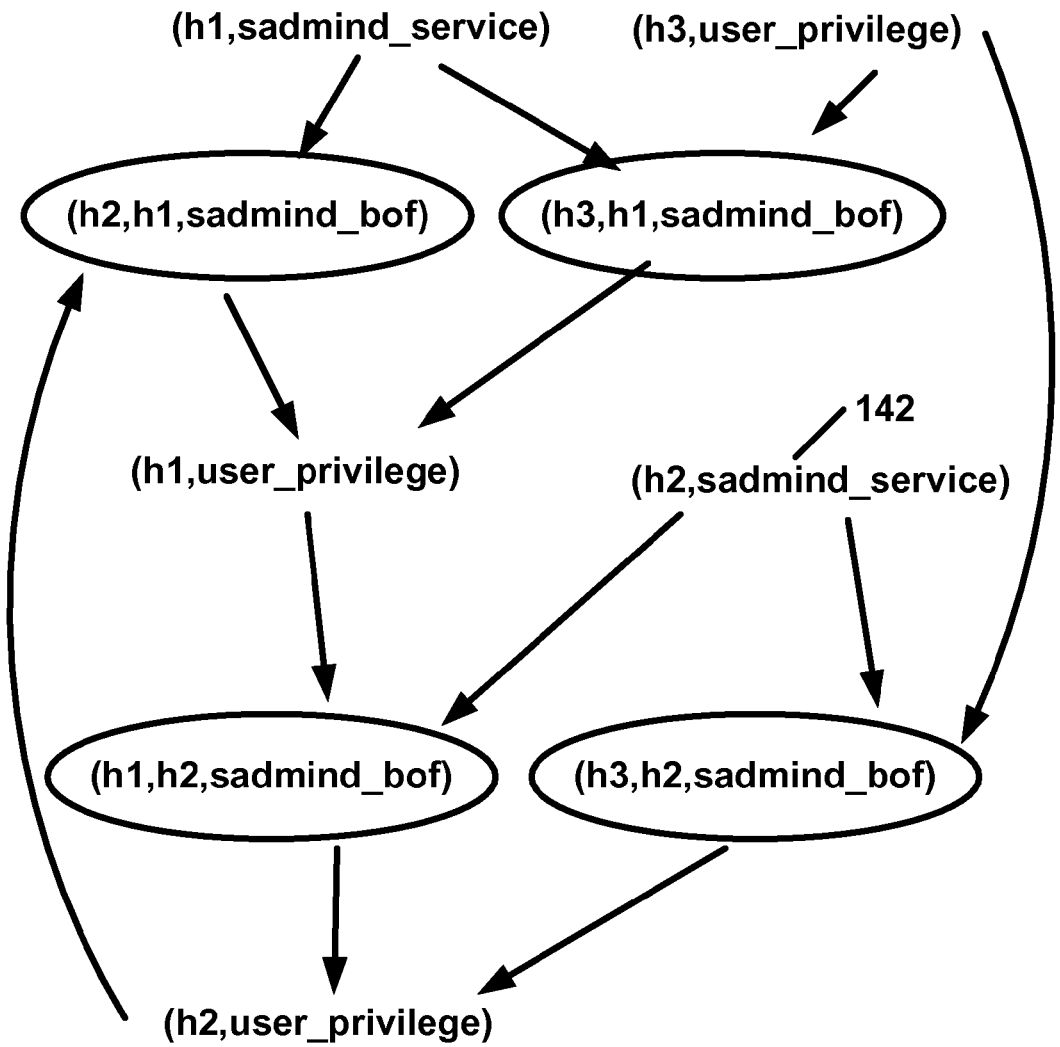
FIG. 1A depicts a running example of an attack graph with the exploits shown as ovals as per an aspect of an embodiment of the present invention.

Embodiments of the present invention enable interactive analysis of attack graphs. Attack graphs depict ways in which an adversary exploits system vulnerabilities in a network such as a computer network. Attack graphs may be important in defending against well-orchestrated network intrusions. However, the current analysis of attack graphs may require an algorithm to be developed and implemented, causing a delay in the availability of analysis. Such a delay is usually unacceptable because the needs for analyzing attack graphs may change rapidly in defending against network intrusions. An administrator may want to revise an analysis upon observing its outcome. Such an interactive analysis, similar to that in decision support systems, is difficult, if at all possible with current approaches based on proprietary algorithms. Embodiments of the present invention enable interactive analysis of attack graphs.

Embodiments of the present invention include a relational model for representing necessary inputs including network configuration and domain knowledge. An attack graph may be generated from those inputs as relational views. Analyses of the attack graph may be realized as relational queries against the views. These embodiments should eliminate the need for developing a proprietary algorithm for each different analysis, because an analysis is now simply a relational query. The interactive analysis of attack graphs should now be possible, because relational queries may be dynamically constructed and revised at run time. Moreover, the mature optimization techniques in relational databases may also be used to improve the performance of the analysis.

As the result of topological vulnerability analysis, an attack graph may describe all possible sequences of exploits an attacker can follow to advance an intrusion [16, 18, 1] into a network. Attack graphs have been explored for different purposes in defending against network intrusions. First, an attack graph may more clearly reveal the weakness of a network than individual vulnerabilities do by providing the context of attacks. Second, attack graphs may indicate available options in removing identified weaknesses and help administrators to preferably choose an optimal solution. Third, the knowledge encoded in attack graphs may also be used to correlate isolated alerts into probable attack scenarios. However, many current approaches to the analysis of attack graphs share a common limitation. That is, a proprietary algorithm may need to be developed and implemented before the corresponding analysis becomes possible. Standard graph related algorithms usually do not apply here due to unique characteristics of attack graphs. However, the delay in the analysis of attack graphs is usually unacceptable for defending against network intrusions. The needs for analyzing an attack graph usually changes rapidly due to constantly changing threats and network configurations. An administrator may need to modify an analysis after the results of that analysis are observed. Such an interactive analysis, similar to that in decision support systems, is difficult if at all possible with current approaches based on proprietary algorithms.

Embodiments of the present invention provide a solution to the interactive analysis of attack graphs. First, the embodiments may represent in a relational model the necessary inputs including network configuration and domain knowledge. The embodiments may then generate attack graph(s) using relational queries, which can either be materialized as relations or simply left as the definition of relational views. The latter case is especially suitable for large networks where materializing the complete attack graph may be prohibitive. Second, analyses of attack graphs may be realized as relational queries. The interactive analysis of attack graphs should now be possible, because administrators can immediately pose new queries based on the outcome of previous analyses. Finally, as a side-benefit, the performance of an analysis can usually be transparently improved by the mature optimization techniques available in most relational databases.

Attack graphs represent the knowledge about the inter-dependency between vulnerabilities. Model checking was first used to decide whether a goal state is reachable from the initial state and later used to enumerate all possible sequences of attacks connecting the two states. However, the number of attack sequences is potentially exponential, leading to high complexity. A more compact representation based on the monotonicily assumption (that is, an attacker never relinquishes an obtained capability) may be used. The new representation may keep exactly one vertex for each exploit or condition, leading to attack graphs of polynomial size.

Analyses of attack graphs have been used for different purposes in defending against network intrusions. Minimal critical attack set analysis finds a minimal subset of attacks whose removal prevents attackers from reaching a goal state. However, the attacks in a minimal critical attack set are not necessarily independent, and a consequence may not be removed without removing its causes. This observation leads to the minimum-cost hardening solution, which is a minimal set of independent security conditions. Finding the minimum set of attacks leading to given goals may be computationally infeasible, whereas a minimal set may be found in polynomial time. All attacks involved in at least one of such minimal sets of attacks may also be enumerated. Finally, in exploit-centric alert correlation, attack graphs may assist the correlation of isolated intrusion alerts.

The afore-mentioned analysis of attack graphs is largely based on proprietary algorithms. However, as mentioned earlier, this may delay a new analysis and make interactive analysis impossible. The disclosed embodiments remove this limitation and enable interactive analysis of attack graphs. On the other hand, decision support systems, such as on-line analytical processing (OLAP) [7], have been used for interactive analysis of data for a long time. However, an analyst there is usually interested in generalized data and statistical patterns, which is different from the analysis of attack graphs.

Attack graphs are usually visualized as a directed graph having two type of vertices, exploits and security conditions (or simply conditions). An exploit is a triple $(h_s, h_d, v)$, where $h_s$ and $h_d$ are two connected hosts and v is a vulnerability on the destination host $h_d$. A security condition is a pair (h, c) indicating the host h satisfies a condition c relevant to security (both exploits and conditions may involve more hosts, for which the model can be easily extended).

An attack graph preferably has two types of edges denoting the inter-dependency between exploits and conditions. First, a require relation is a directed edge pointing from a condition to an exploit. The edge means the exploit cannot be executed unless the condition is satisfied. Second, a imply relation points from an exploit to a condition. This means executing the exploit should satisfy the condition. Notice that there is usually no edge between exploits (or conditions). Example 1 illustrates the concept of attack graph.

EXAMPLE 1

Figure 1B:
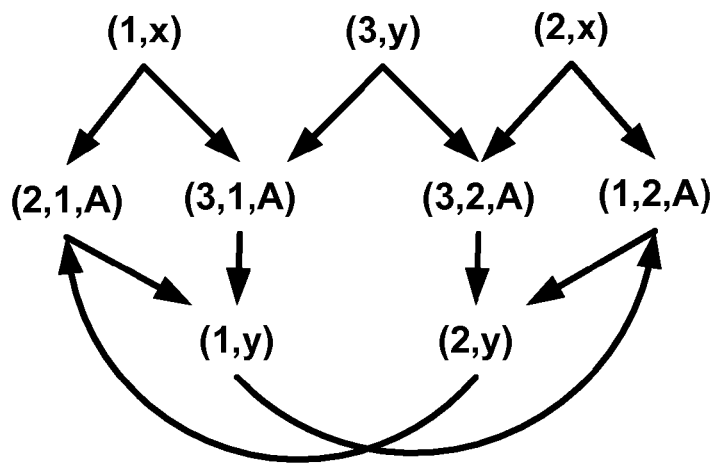
FIG. 1B illustrates an example of a simplified version the attack graph with the exploits shown as triplets as per an aspect of an embodiment of the present invention.

FIG. 1A depicts a running example of an attack graph with the exploits shown as ovals. FIG. 1B illustrates an example of a simplified version the attack graph with the exploits shown as triplets. In FIG. 1B, x denotes the existence of a vulnerability SADMIND BUFFER OVERFLOW (Nessus ID 11841), y the user privilege, and A the exploitation of that vulnerability. The attack graph shows an attacker having user privilege on host 3 may exploit the vulnerability on hosts 1 and 2 and obtain user privilege on the hosts.

Two important aspects of attack graphs are as follows. First, the require relation should always be conjunctive whereas the imply relation should always be disjunctive. More specifically, an exploit should not be realized until all of its required conditions have been satisfied, whereas a condition may be satisfied by any one of the realized exploits. Second, the conditions may be further classified as initial conditions (the conditions not implied by any exploit) and intermediate conditions. An initial condition may be independently disabled to harden a network, whereas an intermediate condition usually cannot be [12].

A Relational Model for Attack Graphs. In the relational model, the complete attack graph may be left as the result of a relational query (i.e. not explicitly represented in our model). The result to the query may be materialized, or the query can simply be left as a view. Such flexibility may be important to large networks where materializing the complete attack graph may be prohibitive. Two inputs may be modeled, the network configuration (vulnerabilities and connectivity of the network) and the domain knowledge (the interdependency between exploits and conditions), as illustrated in Example 2. The domain knowledge may be available in tools like the Topological Vulnerability Analysis (TVA) system developed at George Mason University, which covers more than 37,000 vulnerabilities taken from 24 information sources including X-Force, Bugtraq, CVE, CERT, Nessus, and Snort [8]. On the other hand, the configuration information including vulnerabilities and connectivity may be easily obtained with tools such as the Nessus scanner [5].

EXAMPLE 2

FIG. 2 shows an example of a network configuration and domain knowledge used in generating the attack graph in Example 1. The left-hand side of FIG. 2 shows the connectivity between three hosts, and initially hosts 1 and 2 satisfy the condition x and host 3 satisfies y. The right-hand side of FIG. 2 shows that an attacker may exploit the vulnerability A on the destination (denoted by the symbol D) host, if it satisfies x and the source host satisfies y at the same time. This exploitation should then satisfy y on the destination host.

Definition 1 should define the schema of a model. The connectivity relation represents the connectivity from each the source host $H_s$ to the destination host $H_d$. The condition relation indicates a host H having an initial condition C. The condition-vulnerability dependency relation indicates a condition C is required for exploiting a vulnerability V on the destination host. The attribute F indicates whether the condition C belongs to the source (S) or the destination (D) host. The vulnerability-condition dependency relation indicates a condition C is satisfied by exploiting a vulnerability V.

The last three relations together with the condition relation may be required for representing the complete attack graph (those relations may or may not need to be materialized). The vertices are conditions (the relation HC) and exploits (the relation EX), and the edges interconnect them are represented by relations CE and EC. Each relation has a composite key composed of all the attributes in that relation. Example 3 shows the relational model of Example 2.

Definition 1. Define the following relational schemata:
Connectivity $HH=(H_s, H_d)$
Condition HC=(H, C)
Condition-Vulnerability Dependency CV=(C, F, V)
Vulnerability-Condition Dependency VC=(V, C)
Exploit $EX=(H_s, H_d, V)$ Condition-Exploit $CE=(H, C, H_s, H_d, V)$ Exploit-Condition $EC=(H_s, H_d, V, H, C)$

EXAMPLE 3

Table 1 (shown in FIG. 3) describes a relational model composed of four relations, which represent Example 2. Specifically, Table 1 represents a network configuration and domain knowledge in a relational model.

Analyzing Attack Graphs with Relational Queries: First, how an attack graph may be generated using relational queries based on the model will be described. Second, a typical analysis of attack graphs as relational queries will be described.

Generating Attack Graphs Using Relational Queries: The generation of the complete attack graph from given network configuration and domain knowledge may be regarded as a special analysis that may be conducted using relational queries. First, Example 4 illustrates a generation procedure similar to that in [1].

EXAMPLE 4

Given the network configuration and domain knowledge in Example 2, the attack graph in FIG. 1 may be generated using an iterative procedure as follows. Initially, the attack graph only includes the three initial conditions $(1, x), (3, y), (2, x)$ as vertices. First, domain knowledge implies that the conditions $(1, x)$ and $(3, y)$ jointly imply the exploit $(3, 1, A)$, and $(2, x)$ and $(3, y)$ jointly imply $(3, 2, A)$. Second, the two conditions $(1, y)$ and $(2, y)$ are satisfied. Next, the above two steps may be repeated with the two new conditions and insert four more edges between $(1, y), (2, y)$ and the two exploits. The process may then terminate because no new conditions are inserted in the second iteration.

The key challenge in realizing the above procedure using relational queries may lie in the conjunctive nature of the require relation. More specifically, an exploit may not be realized unless all the required conditions are satisfied. In contrast, the imply relation may be easily realized using a join operation, since a condition may be satisfied by any one of the realized exploits. This issue may be dealt with two set-difference operations as follows (similar to the division operation in relational algebra). Intuitively, one may first subtract (that is, set difference) the satisfied conditions from the conditions required by all possible exploits. The result should include all the unsatisfied but required conditions, from which the exploits that cannot be realized may be derived. The unrealizable exploits from all possible exploits may be subtracted to derive those exploits that can indeed be realized.

Definition 2 states relational queries corresponding to each iteration of the procedure illustrated in Example 4. In the definition, $Q_1$ and $Q_2$ are intermediate results (subscripts in numbers are used to denote intermediate results) of satisfied and unsatisfied conditions up to this iteration, respectively. The vertices of the attack graph are $Q_e$ and $Q_c$, which are realized exploits and satisfied conditions, respectively. The fourth and fifth relation jointly composes the edge set. The set union operations do not keep duplicates, and hence this process should always terminate. Example 5 illustrates those queries.

Definition 2. Given hh(HH), hc(HC), cv(CV), and vc(VC), let $Q_c$=hc, and let $Q_e(EX), Q_{ce}(CE), Q_{ec}(EC)$ be empty relations, define queries $Q_1 = \sigma H_s = H \vee H_d = H(hh \times \Pi_V(vc) \times hc)$ $Q_2 = \Pi_{Hx,Hd,V,Hd,C}(hh \times \sigma_{F=D}(cv)) \cup \Pi_{Hs,Hd,V,Hs,C}(hh \times \sigma_{F=s}(cv)) - Q_1$ $Q_e = (\Pi_{Hs,Hd,V}(hh \times cv) - \Pi_{Hs,Hd,V}(Q_2)) \cup Q_e$ $Q_{ce} = \Pi_{Hd,C,Hs,Hd,V}(Q_e \times \sigma_{F=D}(cv)) \cup \Pi_{Hs,C,Hs,Hd,V}(Q_e \times \sigma_{F=s}(cv)) \cup Q_{ce}$ $Q_{ec} = \Pi_{Hs,Hd,V,Hd,C}(\sigma Q_{e.v} = v_{c.v}(Q_e \times vc)) \cup Q_{ec}$ $Q_c = \Pi_{H,C}(Q_{ec}) \cup Q_c$

EXAMPLE 5

FIG. 4 shows Table 2, which is an example of one iteration in deriving an attack graph. Specifically, Table 2 shows the result to each query in the first iteration in generating the attack graph of Example 1. The relation $Q_1$ includes the satisfied conditions and their related (but not necessarily realizable) vulnerabilities. Subtracting those from the conditions required by possible exploits yields two unsatisfied conditions and unrealizable exploits in $Q_2$. Then, subtracting unrealizable exploits from possible exploits gives two realizable exploits in $Q_e$. The exploits then imply the two conditions in $Q_c$. The edges in $Q_{ce}$ and $Q_{ec}$ interconnect the conditions and exploits.

Typical Analyses of Attack Graphs in Relational Queries: Typical analyses of attack graphs and how to rewrite those analyses as relational queries based on our model will now be disclosed. In the following discussion, the queries are against the relations (or views) given by Definition 2.

Vulnerability-Centric Alert Correlation and Prediction: The alert correlation method maps a currently received intrusion alert to the corresponding exploit. Then, it reasons about previous exploits (alerts) that prepare for the current one and possible exploits in the future [20]. The key difference between this analysis and the one used to generate the attack graph is that the conjunctive nature of the required relation should be ignored here. The relationship between alerts is usually regarded as casual instead of logical [10, 3]. Such a conservative approach is more appropriate in this context because alerts may have been missed by intrusion detection systems.

EXAMPLE 6

In FIG. 1, suppose the current alert maps to the exploit $(2, 1, A)$. The backward search will first reach conditions $(1, x)$ and $(2, y)$ and then follows $(2, y)$ to $(3, 2, A)$ and $(1, 2, A)$ to find a previous correlated alert if there is any, or to make a hypothesis for a missing alert, otherwise. The search continues from $(1, 2, A)$ to $(1, y)$ and $(2, x)$, then from $(1, y)$ to $(3, 1, A)$ (the branch to $(2, 1, A)$ is a loop and hence ignored) and consequently to $(1, x)$ and $(3, y)$. The search stops when it reaches only initial conditions or if a loop is encountered.

Definition 3 states the relational queries corresponding to the backward search in Example 6. The forward search may be realized in a similar way and hence is omitted. First, the relation $Q_3$ includes the conditions reachable from the current exploits while ignoring the conjunctive relationship between those conditions. Second, subtracting from $Q_3$ the initial conditions in hc and the previously visited conditions in $Q_5$ (to avoid loops) yields the reachable conditions and consequently the exploits in $Q_4$. The above two steps should be repeated until no more conditions are left (that is, all the conditions are in hc or in $Q_5$). The exploits encountered in this process may be collected in QA as the final result. Loops should be avoided in this process because the set union operation does not keep duplicates and the relation $Q_5$ ensures each condition to be visited at most once.

Definition 3. Given hh(HH), hc(HC), cv(CV), vc(VC), and $(h_s, h_d, V)$, let $Q_3(HC)$, $Q_5$, and $Q_4$ be empty relations and $Q_4(EX)=\{(h_s, h_d, V)\}$. Define $$Q_3 = \Pi_{hd,C}(Q_4 \bowtie \sigma_{F=D}(cv)) \cup \Pi_{hs,C}(Q_4 \bowtie \sigma_{F=s}(cv))$$

$$Q_4 = \Pi_{Hs, Hd, V}(\sigma_{Hd=H} \wedge Q_3.C=vc.c((hh \times (Q_3-hc-Q_5) \times vc))$$

$$Q_5 = Q_5 \cup Q_3$$

$$Q_4 = Q_4 \cup Q_4$$

EXAMPLE 7

Table 3, shown in FIG. 5, illustrates an example of analyzing attack graphs for alert correlation and prediction. Specifically, Table 3 shows the three iterations corresponding to the backward search in Example 6. The first iteration starts from the given exploit (2, 1, A) and reaches two exploits (1, 2, A) and (3, 2, A) through the condition (2, y). The second iteration reaches (3, 1, A) and (2, 1, A) through (1, y). The exploit (2, 1, A) leads to two previously visited conditions (that is, a loop) and the other exploit (3, 1, A) reaches only initial conditions. Consequently, no new exploit appears in $Q_4$ in this iteration and the search terminates.

Enumerating Relevant Attacks and Network Hardening: Enumerating the relevant exploits (those that appear in at least one sequence of attacks leading to the goal conditions [1]) and finding a network hardening solution (given goal conditions represented as a logic formula of initial conditions [12]) share a similar backward search in the attack graph, as illustrated in Example 8 and Example 9, respectively.

EXAMPLE 8

As illustrated in FIG. 1A, one starts from a given goal condition (1, y) and searches backwards in the attack graph. First, the two exploits (3, 1, A) and (2, 1, A) are reached. The former branch ends at initial conditions, and the latter leads to one initial condition (1, x) and an intermediate condition (2, y). The condition (2, y) then leads to (3, 2, A) and (1, 2, A). The former ends at initial conditions, and the latter leads to a loop back to (1, y). The relevant exploits with respect to the goal condition (1, y) are thus (2, 1, A), (3, 1, A), and (3, 2, A) (the exploit (1, 2, A) is not relevant because it can never be realized before satisfying the goal (1, y) itself).

EXAMPLE 9

With a similar search, one can transform the goal condition (1, y) into a logic formula of initial conditions as follows (by regarding the exploits and conditions as Boolean variables). In the fourth line, the value FALSE replaces the second appearance of the goal condition (1, y), because it is a predecessor of (1, 2, A), indicating a loop. The final result says that if any of the two conditions (1, x) and (3, y) is disabled, then the goal can no longer be satisfied.

$(1, y) \equiv (3, 1, A) \vee (2, 1, A)$ $\equiv (1, x) \wedge (3, y) \vee (1, x) \wedge (2, y)$ $\equiv (1, X) \wedge (3, y) \vee (1, x) \wedge ((3, 2, A) \vee (1, 2, A))$ $\equiv (1, x) \wedge (3, y) \vee (1, x) \wedge ((3, y) \wedge (2, x) \vee (2, x) \wedge FALSE)$ $\equiv (1, x) \wedge (3, y)$ The key differences between the above backward search and that used for correlating alerts are as follows. First, the conjunctive nature of the require relation should be considered. In Example 8, the exploit (1, 2, A) is not relevant, because one of its required conditions (1, y) is not satisfiable, even though the other required condition (that is, (2, x)) is already satisfied. Second, duplicate appearances of exploits and conditions should be kept. This is required for obtaining sequences of relevant exploits leading to the goal, as well as for generating the logic formula in network hardening. In the former case, different sequences may share common exploits or conditions, whereas the logic formula in the second case clearly contains duplicates. In order for the search to traverse an exploit or condition for multiple times, the set union operation needs to keep duplicates. Hence, loops must be avoided by maintaining a predecessor list for each vertex as in standard breadth-first search (BFS) [2] (although the search discussed above is different from a BFS).

Definition 4 states the relational queries used to enumerate relevant exploits or to generate the logic formula in network hardening. The two queries simply traverse the attack graph given by Definition 2. The two relations in the definition keep duplicates in set union operations. Notice that the actual construction of the logic formula (adding the and or connectives) is external to the relational queries and may easily be incorporated.

Definition 4. Given relations hh(HH), hc(HC), cv(CV), vc(VC) and a nonempty relation $Q_7$(HC), let $Q_6$(EX) be an empty relation. Define $$Q_6 = \Pi_{Hs,Hd,V}((Q_7 - hc) \bowtie_{Qec})$$

$$Q_7 = \Pi_{H,C}(Q_6 \bowtie Q_{ce})$$

EXAMPLE 10

FIG. 6 shows Table 4, an example of enumerating relevant exploits and network hardening. Specifically, Table 4 shows the iterations corresponding to the procedure in Example 8 and Example 9. Originally, $Q_7\{(1, y)\}$.

Reachability From Subsets of Initial Conditions and Incremental Updates of Attack Graphs: Many analyses ask a similar question, that is whether the goal condition is still satisfiable if a given subset of initial conditions are disabled. The question may arise when trying to determine the potential effect of enforcing a security measure (so some initial conditions will be disabled), or when trying to decide whether the goal condition is reachable with only stealthy attacks [18]. The question may also be asked simply because the network configuration has changed and some initial conditions are no longer satisfied (on the other hand, new initial conditions can be easily handled with more iterations of the queries in Definition 2.) In each case, it may be possible to recompute the attack graph from scratch, with the given conditions removed from the relation hc. However, this may not be desirable, especially when the attack graph is much larger than the set of conditions to be disabled. Instead, one may incrementally update the attack graph by computing the effect of disabling the given conditions. The conjunctive nature of the required relation may be taken into account, but in a different way, as illustrated in Example 11.

EXAMPLE 11

In FIG. 1, suppose the condition (2, x) is disabled. Then the exploits (1, 2, A) and (3, 2, A) may no longer be realized. Then the condition (2, y) becomes unsatisfiable, because the condition (2, y) may only be implied by the above two exploits. Finally, the exploit (2, 1, A) may no longer be realized. However, the condition (1, y) should still satisfiable, due to another exploit (3, 1, A).

Example 11 shows that such a negative analysis is quite different from the previous ones. The previous searches are unidirectional in the sense that the edges are only followed in one direction (either forwards or backwards). However, the above analysis follows edges in both directions. For example, after the forward search reaches the condition (1, y) from the exploit (2, 1, A), it must go back to see whether other exploits also imply the condition (1, y) (in this case, the exploit (3, 1, A) does so). Definition 5 states the relational queries for this purpose. The first query simply derives unrealizable exploits from unsatisfied conditions. The next three queries use two set difference operations to derive the unsatisfied conditions while taking into account the conjunctive nature of the require relation. Finally, the results may be collected.

Definition 5. Given relations hh(HH), hc(HC), cv(CV), vc(VC) and a nonempty relation $Q_{11}$(HC) as a subset of hc, let $Q_8$(EX), $Q_9$(EC), $Q_{10}$(EC), $Q_e$, and $Q_c$ be empty relations. Define $$Q_8 = \Pi_{Hs, Hd, r}(Q_{11} \bowtie Q_{ce})$$

$$Q_9 = Q_8 \bowtie Q_{ec}$$

$$Q_{10} = Q_{ec} \bowtie \Pi_{H,C}(Q_9) - Q_9$$

$$Q_{11} = \Pi_{H,C}(Q_9) - \Pi_{H,C}(Q_{10})$$

$$Q_e = Q_e \cup Q_8$$

$$Q_c = Q_c \cup Q_{11}$$

EXAMPLE 12

FIG. 7 shows Table 5, an example of incremental updates. Specifically, Table 5 shows the iterations corresponding to the procedure in Example 11. Originally, $Q_{11} = \{(2, x)\}$.

Empirical Results: As proof of concept, the analyses discussed in the previous section were implemented. The queries were written in PL/SQL and tested in Oracle 9i in its default settings on a Pentium IV 2 GHz PC with 512 MB RAM. Preliminary experiments tested the queries against the attack scenario originally studied in [18, 1] 3. The results of the analyses match those in the previous work, which justifies the correctness of the techniques. Next, the performance of the techniques were tested. There were two main objectives. First, determine whether the running time of the queries is practical for interactive analysis. For most decision support systems, the typical delay to a query that is considered as tolerable in interactive analyses is usually in a matter of seconds. Such a short delay is also critical to the analysis of attack graphs, especially when the analysis is used for real-time detection and prevention of intrusions.

Figure 8A:
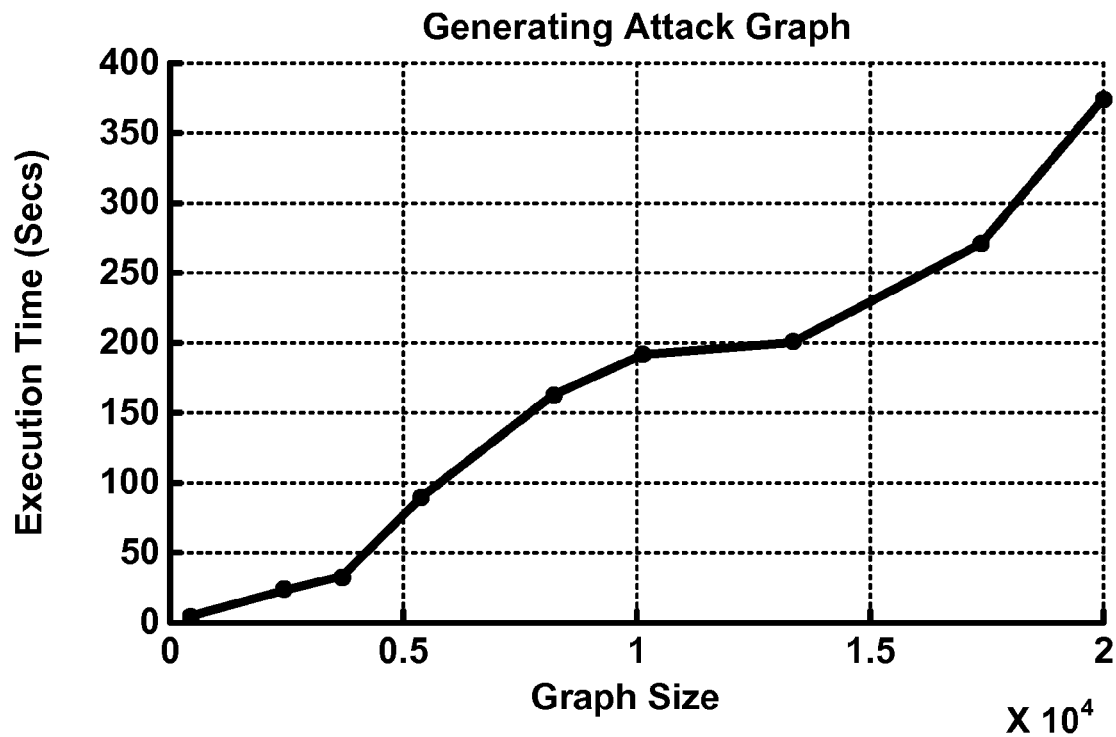
FIG. 8A is a graph showing the performance of generating attack graphs as per an aspect of an embodiment of the present invention.
Figure 8B:
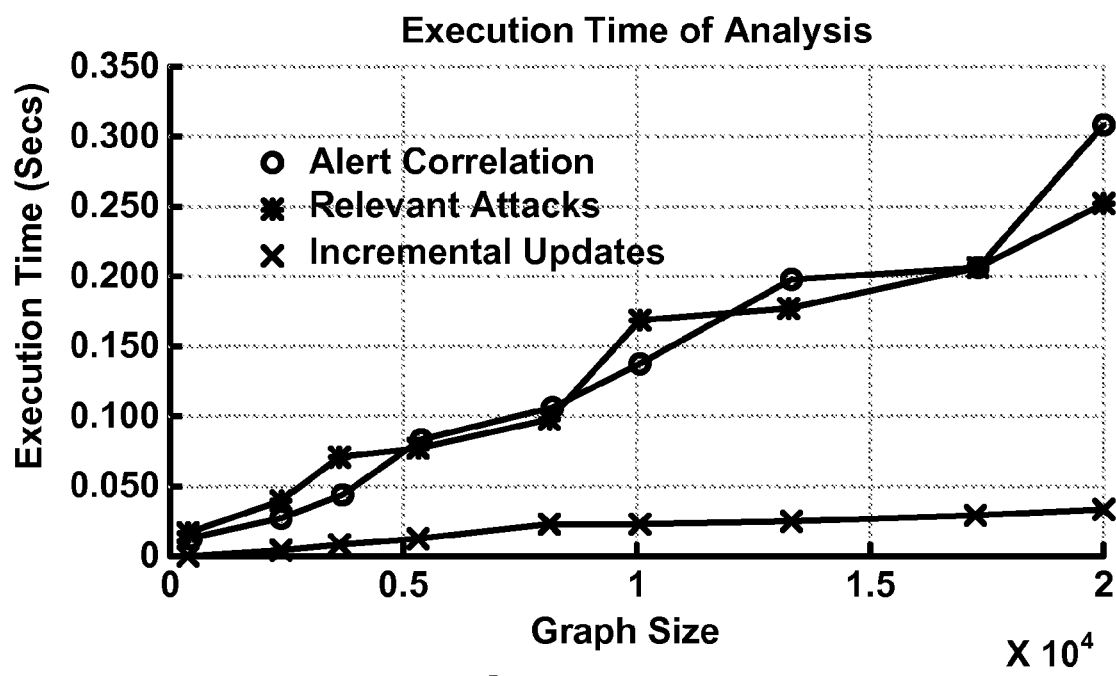
FIG. 8B is a graph showing the performance of analysis execution as per an aspect of an embodiment of the present invention.

Second, determine whether the techniques scale well in the size of attack graphs. Although the attack graph may be very large for a large network, an analysis and its result usually only involves a small part of the attack graph. The running time of an analysis thus depend on how efficiently an analysis searches the attack graph. Mature optimization techniques available in most databases may transparently improve the performance and make the analyses more scalable. To test the queries against large attack graphs in a manageable way, the number of vertices in the original attack graph were increased by randomly inserting new hosts with random connectivity and vulnerabilities. The same set of analyses was executed in the new network and the running time of each analysis measured. The main results are shown in FIG. 8. All the results have 95% confidence intervals within about 5% of the reported values.

The left-hand side shows the running time of generating the attack graph in the size of that attack graph. The attack graph with bout 20,000 vertices may be generated in less than seven minutes. The result also shows that the methods scale well in the size of attack graphs. The right-hand side shows the running time of each analysis in the size of the attack graph. The result shows that all the analyses require less than a second, which clearly meets the requirement of an interactive analysis. The analyses all scale well with the size of the attack graph. This proves our conjecture that the optimization techniques in databases such as indexing can transparently help to keep analyses efficient. A closer look at the result reveals that the increase in running time is mainly caused by larger results. This may also explain the fact that the incremental update analysis scales differently from the other two (the effect of disabled initial conditions does not change much when the size of the attack graph increases).

Figure 9:
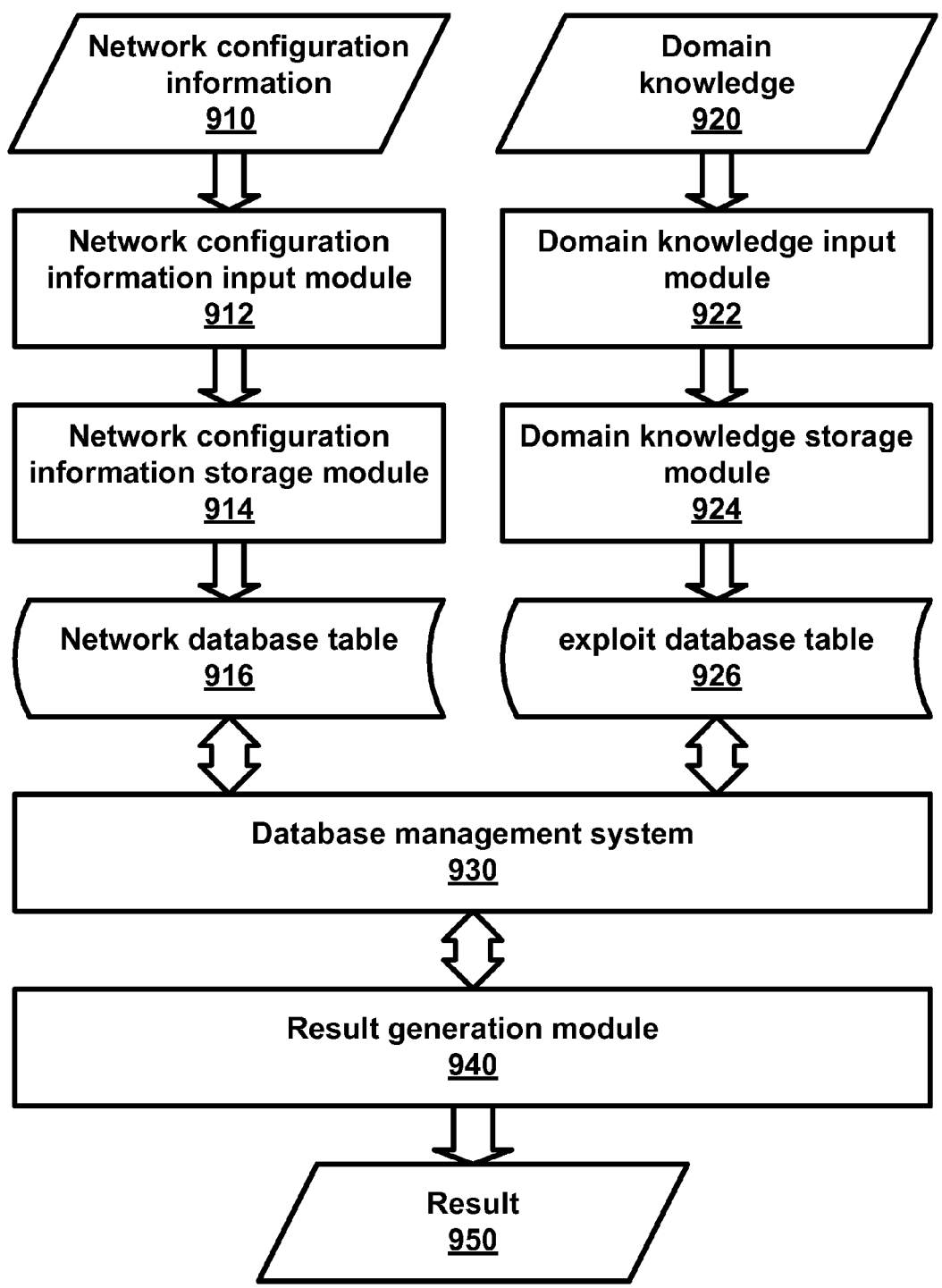
FIG. 9 is a block diagram of an aspect of an embodiment of the present invention.
Figure 10:
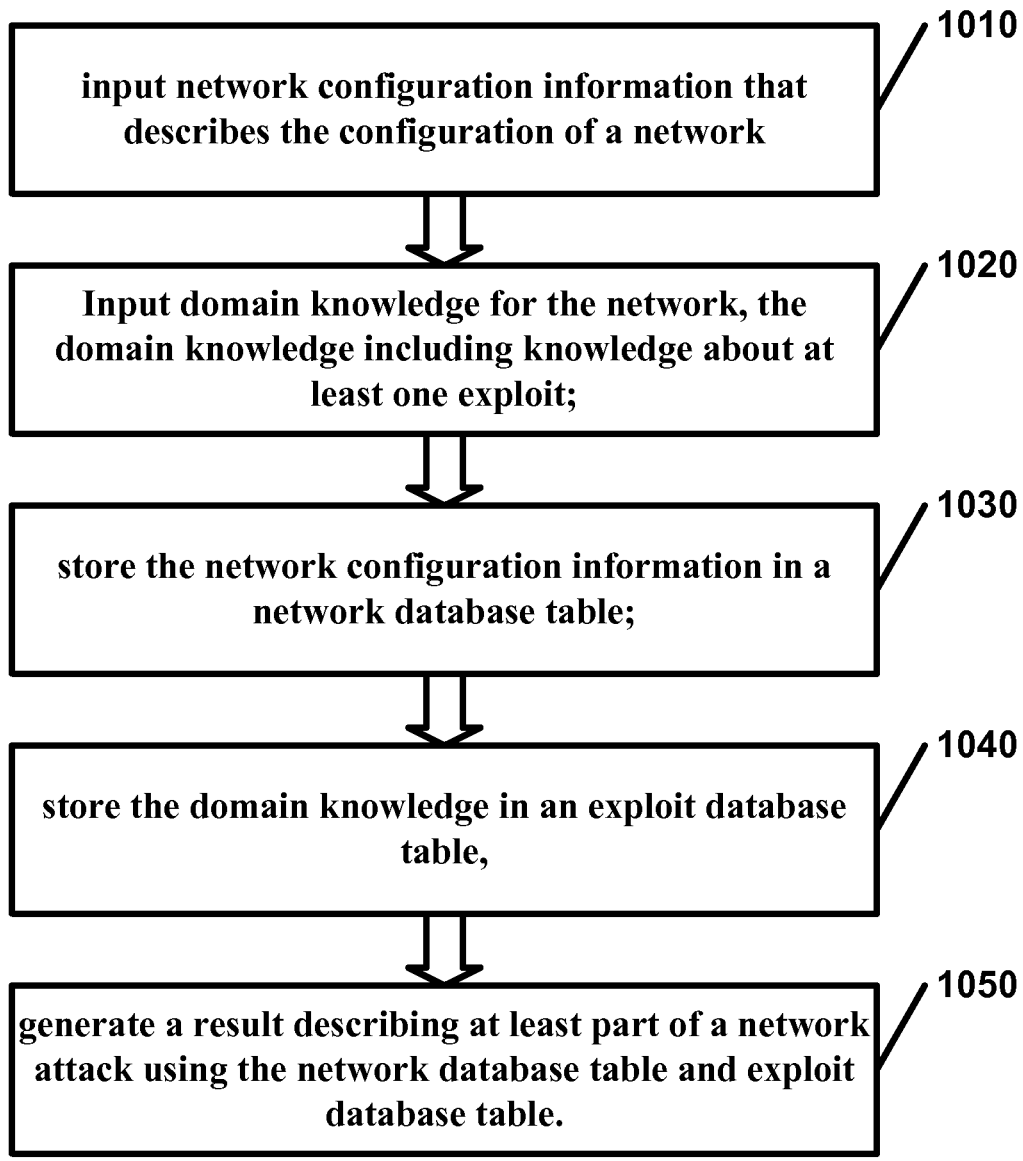
FIG. 10 is a flow diagram of an aspect of an embodiment of the present invention.

FIG. 9 is a block diagram of an aspect of an embodiment of the present invention and FIG. 10 is a flow diagram of an aspect of an embodiment of the present invention. This illustrated system 900 for analyzing attack graphs may use functional modules that may be implemented in software, hardware, or a combination thereof. The hardware can include microprocessors that execute programs stored in memory, discrete logic or programmable logic devices (PLS) such as field programmable gate arrays (FPGAs), complex programmable logic devices (CPLDs), application-specific integrated circuits (ASIC), or the like. Some programmable devices may be programmed using software hardware description languages (HDL). The software may include programming languages, application programs, or the like. Each of these options may use configuration data. The modules may reside on one or more tangible computer readable mediums containing a set of computer readable instructions that are executable by one or more processors. Computer readable mediums include RAM, floppy disks, optical disks (such as CD's, DVD's, or HD-DVD's), hard disks, flash drives, or the like.

The modules may include a network configuration information input module 912, a domain knowledge input module 922, a network configuration information storage module 914, a domain knowledge storage module 924, and a result generation module 940.

The network configuration information input module 912 is preferably configured to input network configuration information 910 that describes the configuration of a network at 1010. The network may be any interconnected group or system including a computer network, an electrical network, a telecommunications network, a road network, or the like. Computer networks generally include interconnected computers, hosts, servers, routers, cables and the like. The network information describes elements of the networks and how they connect to each other.

At least part of the network configuration information 910 may describe at least part of the physical structure of the network. The network configuration information 910 may include at least one of the following: host information; host configuration information; application information; network service information; or operating system information; or a combination of the above. In general terms, a host is a computer at a specific location on a computer network. Examples of host configuration information include descriptions and configurations of computer related hardware for host machines within a computer network. Application information may include information about applications such as Microsoft Office applications or Oracle that run on the network. Generally network services are installed on one or more servers to provide shared resources to client computers. They may include administrative functions, security function. Common network services include: authentication servers, directory services. Dynamic Host Configuration Protocol (DHCP), DNS, e-mail, printing, Network file system, and the like. Operating system information preferably includes information about operating systems running in the networks. An operating system (OS) is a set of computer programs that manage the hardware and software resources of a computer. An operating system processes raw system and user input and responds by allocating and managing tasks and internal system resources as a service to users and programs of the system. At the foundation of all system software, an operating system performs basic tasks such as controlling and allocating memory, prioritizing system requests, controlling input and output devices, facilitating networking and managing file systems. Examples of operating systems include: Windows XP and Unix.

The domain knowledge input module 922 is preferably configured to input domain knowledge 920 for the network at 1020. Domain knowledge 920 may include knowledge about various exploits in the network. An exploit is an action that an attacker can take to advance a goal. An exploit includes but is not limited to: software, chunks of data, or sequences of commands that take advantage of a bug, glitches or vulnerabilities. The exploits are usually intended to cause unintended or unanticipated behavior to occur on computer software, hardware, or something electronic (usually computerized). This frequently includes such things as gaining control of a computer system or allowing privilege escalation or a denial of service attack.

The network configuration information storage module 914 is preferably configured to store network configuration information 910 in at least one network database table 916 at 1030. Similarly, the domain knowledge storage module 924 is preferably configured to store the domain knowledge 920 in at least one exploit database table 926 1040.

The result generation module 940 is preferably configured to generate a result 950 using the network database table 916 and exploit database table 926 at 1050. The result 950 may be generated in many ways. For example the network database table 916 and exploit database table 926 could be used to generate another table that describes a complete attack graph. An attack graph is a graph that shows attack paths. An attack path may include a chain of exploits where each exploit lays the groundwork for subsequent exploits.

A result 950 may be generated in response to a query to a database management system 930 that has access to the network database table 916 and exploit database table 926. A database is a collection of records or data that is stored in a format such as a computer readable table so that a program can consult it to answer queries. The records retrieved in answer to queries may become information that can be used to make decisions. The computer program used to manage and query a database is known as a database management system (DBMS). A database management system 930 may be computer software designed for the purpose of managing databases. Typical examples of DBMSs include Oracle, DB2, Microsoft Access, Microsoft SQL Server, Postgres, MySQL and FileMaker. Examples of results as per embodiments described herein may include: metric (i.e. number of attackers that can reach a specific target); an attack path; part of an attack path; a collection of paths; an exploit; a condition-exploit pair; an exploit-condition pair; a table that describes an attack graph; a combination of the above; or the like.

The network may be reconfigured to decrease the likelihood of future attacks using the attack information learned from the result 950.

The disclosed relational model enables interactive analysis of attack graphs for intrusion detection and prevention. It was shown that the complete attack graph may be generated as relational views. Analysis of the attack graph may thus be relational queries against such views. It was shown how to write relational queries for typical analyses previously studied in the literature. This novel approach made the analysis of attack graphs an interactive process similar to that in the decision support systems. As a side effect, the mature optimization techniques existing in most relational databases also improved the performance of the analysis.

The following references are provided as background to the above described principles to assist one skilled in the art understand the disclosure.

1. P. Ammann, D. Wijesekera, and S. Kaushik. Scalable, graph-based network vulnerability analysis. In *Proceedings of the 9th ACM Conference on Computer and Communications Security (CCS'02)*, pages 217-224, 2002.

2. T. H. Cormen, C. E. Leiserson, and R. L. Rivest. *Introduction to Algorithms*. MIT Press, 1990.

3. F. Cuppens and A. Miege. Alert correlation in a cooperative intrusion detection framework. In *Proceedings of the 2002 IEEE Symposium on Security and Privacy (S&P'02)*, pages 187-200, 2002.

4. M. Dacier. Towards quantitative evaluation of computer security. Ph.D. Thesis, Institut National Polytechnique de Toulouse, 1994.

5. R. Deraison. Nessus scanner, 1999. Available at http://www.nessus.org.

6. D. Farmer and E. H. Spafford. The COPS security checker system. In USENIX *Summer*, pages 165-170, 1990.

7. J. Gray, A. Bosworth, A. Bosworth, A. Layman, D. Reichart, M. Venkatrao, F. Pellow, and H. Pirahesh. Data cube: A relational aggregation operator generalizing group-by, cross-tab, and sub-totals. *Data Mining and Knowledge Discovery*, 1(1):29-53, 1997.

8. S. Jajodia, S. Noel, and B. O'Berry. Topological analysis of network attack vulnerability. In V. Kumar, J. Srivastava, and A. Lazarevic, editors, *Managing Cyber Threats Issues, Approaches and Challenges*. Kluwer Academic Publisher, 2003.

9. S. Jha, O. Sheyner, and J. M. Wing. Two formal analysis of attack graph. In *Proceedings of the 15th Computer Security Foundation Workshop (CSFW'02)*, 2002.

10. P. Ning, Y. Cui, and D. S. Reeves. Constructing attack scenarios through correlation of intrusion alerts. In *Proceedings of the 9th ACM Conference on Computer and Communications Security (CCS'02)*, pages 245-254, 2002.

11. S. Noel and S. Jajodia. Correlating intrusion events and building attack scenarios through attack graph distance. In *Proceedings of the 20th Annual Computer Security Applications Conference (ACSAC'04)*, 2004.

12. S. Noel, S. Jajodia, B. O'Berry, and M. Jacobs. Efficient minimum-cost network hardening via exploit dependency grpahs. In *Proceedings of the 19th Annual Computer Security Applications Conference (ACSAC'03)*, 2003.

13. R. Ortalo, Y. Deswarte, and M. Kaaniche. Experimenting with quantitative evaluation tools for monitoring operational security. *IEEE Trans. Software Eng.*, 25(5):633-650, 1999.

14. C. Phillips and L. Swiler. A graph-based system for network-vulnerability analysis. In *Proceedings of the New Security Paradigms Workshop (NSPW'98)*, 1998.

15. C. R. Ramakrishnan and R. Sekar. Model-based analysis of configuration vulnerabilities. *Journal of Computer Security*, 10(1/2):189-209, 2002.

16. R. Ritchey and P. Ammann. Using model checking to analyze network vulnerabilities. In *Proceedings of the 2000 IEEE Symposium on Research on Security and Privacy (S&P'00)*, pages 156-165, 2000.

17. R. Ritchey, B. O'Berry, and S. Noel. Representing TCP/IP connectivity for topological analysis of network security. In *Proceedings of the 18th Annual Computer Security Applications Conference (ACSAC'02)*, page 25, 2002.

18. O. Sheyner, J. Haines, S. Jha, R. Lippmann, and J. M. Wing. Automated generation and analysis of attack graphs. In *Proceedings of the 2002 IEEE Symposium on Security and Privacy (S&P'02)*, pages 273-284, 2002.

19. L. Swiler, C. Phillips, D. Ellis, and S. Chakerian. Computer attack graph generation tool. In P*roceedings of the DARPA Information Survivability Conference & Exposition II (DISCEX'01)*, 2001.

20. L. Wang, A. Liu, and S. Jajodia. An efficient and unified approach to correlating, hypothesizing, and predicting intrusion alerts. In Proceedings of the 10th European Symposium on Research in Computer Security (ESORICS 2005), pages 247-266, 2005.

21. D. Zerkle and K. Levitt. Netkuang—a multi-host configuration vulnerability checker. In P*roceedings of the 6th USENIX Unix Security Symposium* (USENIX'96), 1996.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) analyzing attack graphs for a computer network. However, one skilled in the art will recognize that embodiments of the invention could be constructed and used to analyze any type of network. For example, one could use embodiments to analyze attack graphs for road systems. In this example, it may be useful to analyze attacks on a geographical location in an attempt to decrease th likelihood of future attacks on that geographical location.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A system for analyzing attack graphs comprising:
one or more processors;
a network configuration information input module, in communication with the one or more processors, configured to input network configuration information that describes the configuration of a part of a network, at least part of the network configuration information describing at least part of the physical structure of the network, the network configuration information including at least one of the following:
  i) host information;
  ii) host configuration information;
  iii) application information;
  iv) network service information; or
  v) operating system information; or
  vi) a combination of the above;
a domain knowledge input module, in communication with the one or more processors, configured to input domain knowledge for the network, the domain knowledge including knowledge about at least one exploit;
a network configuration information storage module, in communication with the one or more processors, configured to store the network configuration information in at least one network database table;
a domain knowledge storage module, in communication with the one or more processors, configured to store the domain knowledge in at least one exploit database table, the domain knowledge including exploit information; and
a result generation module, in communication with the one or more processors, configured to generate a result using the network database table and exploit database table in response to a query to a database management system about a part of the network, the query comprising a condition of the network which identifies the part of the network subject to the query, the result including at least one of the following:
  i) a metric;
  ii) an attack path;
  iii) part of an attack path;
  iv) a collection of paths;
  v) an exploit;
  vi) a condition-exploit pair;
  vii) an exploit-condition pair; or
  viii) a table that describes an attack graph; or
  ix) a combination of the above; and
wherein the network is reconfigured using attack information learned from the result.

2. A system for analyzing attack graphs comprising:
one or more processors;
a network configuration information input module, in communication with the one or more processors, configured to input network configuration information that describes the configuration of a part of a network;
a domain knowledge input module, in communication with the one or more processors, configured to input domain knowledge for the network, the domain knowledge including knowledge about at least one exploit;
a network configuration information storage module, in communication with the one or more processors, configured to store the network configuration information in a network database table;

a domain knowledge storage module, in communication with the one or more processors, configured to store the domain knowledge in an exploit database table; and a result generation module, in communication with the one or more processors, configured to generate a result describing at least part of a network attack using the network database table and exploit database table in response to a query to a database management system about a part of the network, the query comprising a condition of the network which identifies the part of the network subject to the query.

3. The system according to claim 2, wherein the network configuration information input module, the domain knowledge input module, the network configuration information storage module, the domain knowledge storage module, and the result generation module reside on at least one tangible computer readable medium containing a set of computer readable instructions that are executable by one or more processors.

4. The system according to claim 2, wherein the network configuration information includes host information and host configuration information.

5. The system according to claim 2, wherein at least part of the network configuration information describes at least part of the physical structure of the network.

6. The system according to claim 2, wherein the network configuration information includes application information.

7. The system according to claim 2, wherein the network configuration information includes network service information.

8. The system according to claim 2, wherein the domain knowledge includes exploit information.

9. The system according to claim 2, wherein the exploit table includes more than one exploit database table.

10. The system according to claim 2, wherein the result is a metric.

11. The system according to claim 2, wherein the result is an attack path.

12. The system according to claim 2, wherein the result is part of an attack path.

13. The system according to claim 2, wherein the result is a collection of paths.

14. The system according to claim 2, wherein the result is an exploit.

15. The system according to claim 2, wherein the result is a condition-exploit pair.

16. The system according to claim 2, wherein the result is an exploit-condition pair.

17. The system according to claim 2, wherein the result is a table that describes an attack graph.

18. The system according to claim 2, wherein the network is reconfigured in response to the result.

19. The system according to claim 2, wherein at least part of the network database table and at least part of the exploit database table are stored in a common table.

20. The system according to claim 2, wherein the network configuration information includes operating system information.

21. A tangible computer readable medium containing a set of computer readable instructions that when executed by one or more processors, causes the one or more processors to perform a method for analyzing a network, the method comprising the steps of:

inputting network configuration information that describes the configuration of a part of network;

inputting domain knowledge for the network, the domain knowledge including knowledge about at least one exploit;

storing the network configuration information in a network database table;

storing the domain knowledge in an exploit database table, and generating a result describing at least part of a network attack using the network database table and exploit database table in response to a query to a database management system about a part of the network, the query comprising a condition of the network which identifies the part of the network subject to the query.

* * * * *